(12) United States Patent  
Ozawa et al.

(10) Patent No.: US 9,055,170 B2  
(45) Date of Patent: *Jun. 9, 2015

(54) IMAGE FORMING SYSTEM, IMAGE FORMING DEVICE, AND NON-TRANSITORY COMPUTER READABLE MEDIUM WITH USER CORRELATED PRIORITY ORDER FOR UTILIZING IMAGE FORMING DEVICES

(75) Inventors: Kazuaki Ozawa, Tokyo (JP); Makoto Nishimura, Tokyo (JP); Masahiro Oishi, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 13/456,957

(22) Filed: Apr. 26, 2012

(65) Prior Publication Data

US 2013/0107315 A1 May 2, 2013

(51) Int. Cl.
*G06F 3/12* (2006.01)
*G06K 15/00* (2006.01)
*H04N 1/00* (2006.01)
*H04N 1/32* (2006.01)
*H04N 1/44* (2006.01)

(52) U.S. Cl.
CPC ....... *H04N 1/00244* (2013.01); *H04N 1/00832* (2013.01); *H04N 1/32106* (2013.01); *H04N 1/4406* (2013.01); *H04N 2201/3278* (2013.01); *H04N 2201/3274* (2013.01); *H04N 2201/3202* (2013.01); *G06F 3/1222* (2013.01); *G06F 3/1239* (2013.01); *G06F 3/1267* (2013.01); *G06F 3/1273* (2013.01); *G06F 3/1288* (2013.01); *G06F 3/1291* (2013.01)

(58) Field of Classification Search
USPC .......................................... 358/1.15; 709/240
See application file for complete search history.

(56) References Cited

U.S. PATENT DOCUMENTS

| 7,130,069 | B1 * | 10/2006 | Honma ........................ 358/1.15 |
| 7,400,714 | B2 * | 7/2008 | Tanimoto .................. 379/100.12 |
| 7,894,083 | B2 * | 2/2011 | Kuroda et al. ................ 358/1.13 |
| 2001/0015823 | A1 * | 8/2001 | Sato ............................. 358/1.15 |
| 2003/0061200 | A1 * | 3/2003 | Hubert et al. ..................... 707/3 |
| 2004/0036908 | A1 * | 2/2004 | Yagita et al. .................. 358/1.15 |
| 2006/0050310 | A1 * | 3/2006 | Ito ................................. 358/1.15 |
| 2006/0126104 | A1 * | 6/2006 | Kumar .......................... 358/1.15 |
| 2006/0250631 | A1 * | 11/2006 | Igarashi ......................... 358/1.13 |

(Continued)

FOREIGN PATENT DOCUMENTS

JP    A-2008-242851    10/2008

*Primary Examiner* — Ashish K Thomas  
*Assistant Examiner* — Walter Yehl  
(74) *Attorney, Agent, or Firm* — Oliff PLC

(57) ABSTRACT

Provided is an image forming system including plural image forming devices, a first storage unit that stores user information and device information, an updating unit that updates the device information, and a transmitting device that transmits image data to an image forming device, each image forming device including a second storage unit that stores the image data, a receiving unit that receives an input of the user information, a first acquiring unit that acquires image data from an image forming device, an image forming unit that forms an image, a counter unit that measures frequency in which image data is acquired by another image forming device and stores the user information, the device information, and the measured frequency in the second storage unit in a correlated manner, and a transmitting unit that transmits the user information and the device information to the updating unit.

5 Claims, 16 Drawing Sheets

(56) References Cited

U.S. PATENT DOCUMENTS

2006/0274359 A1* 12/2006 Fukui et al. .................. 358/1.15
2008/0137441 A1* 6/2008 Morikawa et al. ....... 365/189.05
2008/0165372 A1* 7/2008 Yamada et al. ................ 358/1.4
2008/0244756 A1 10/2008 Kitada
2010/0149584 A1* 6/2010 Cech et al. ................... 358/1.15
2010/0245900 A1* 9/2010 Morimoto .................... 358/1.15

* cited by examiner

FIG. 3

| USER ID | SPOOLER INFORMATION | | |
|---|---|---|---|
| | 1 | 2 | 3 |
| user001 | spoolerA | spoolerC | - |
| user002 | spoolerB | spoolerC | - |
| ... | ... | ... | ... |

| USER ID | SPOOLER INFORMATION ||
| --- | --- | --- |
| | 1 | 2 |
| user001 | spoolerA | spoolerC |
| user002 | spoolerB | spoolerC |
| ... | ... | ... |

41a

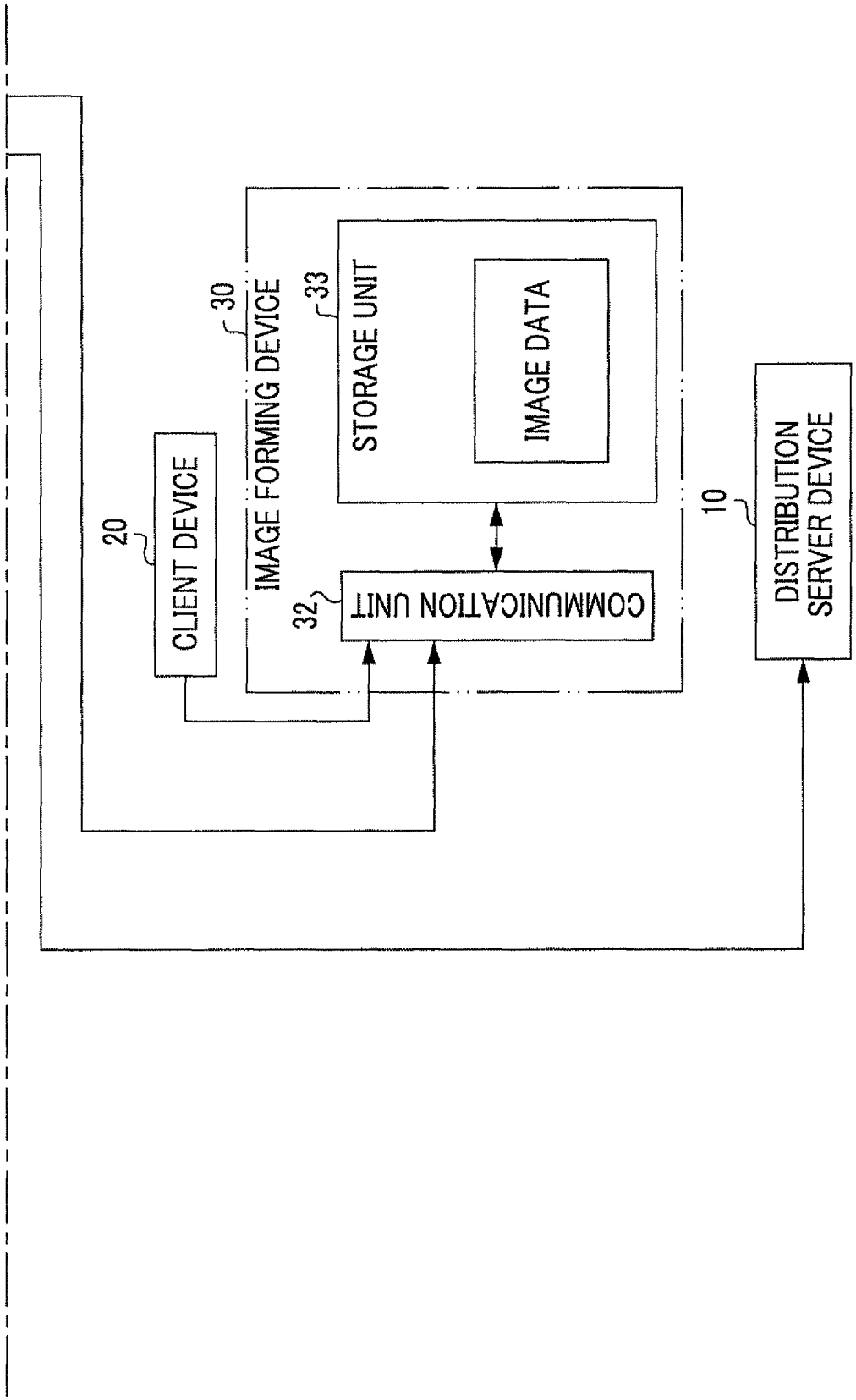

FIG. 15

| USER ID | SPOOLER INFORMATION | | |
|---|---|---|---|
| | 1 | 2 | 3 |
| user001 | spoolerB | spoolerA | spoolerC |
| user002 | spoolerB | spoolerC | ... |
| ... | ... | ... | ... |

41

IMAGE FORMING SYSTEM, IMAGE FORMING DEVICE, AND NON-TRANSITORY COMPUTER READABLE MEDIUM WITH USER CORRELATED PRIORITY ORDER FOR UTILIZING IMAGE FORMING DEVICES

CROSS-REFERENCE TO RELATED APPLICATIONS

This application is based on and claims priority under 35 USC 119 from Japanese Patent Application No. 2011-236282 filed Oct. 27, 2011.

BACKGROUND (i) Technical Field

The present invention relates to an image forming system, an image forming device, and a non-transitory computer readable medium.

(ii) Related Art

A technique of storing image data designated by a user in a print server device so that the image data may be accessed from plural image forming devices is known.

SUMMARY

According to an aspect of the present invention, there is provided an image forming system including: plural image forming devices; a first storage unit that stores user information for identifying a user and device information indicating an image forming device included in the plural image forming devices in a correlated manner; an updating unit that updates the device information stored in the first storage unit; and a transmitting device that transmits image data to an image forming device correlated with the user information indicated by the device information stored in the first storage unit, wherein each image forming device included in the plural image forming devices includes a second storage unit that stores the image data transmitted from the transmitting device, a receiving unit that receives an input of the user information, a first acquiring unit that acquires image data corresponding to the user information from an image forming device correlated with the input user information indicated by the device information stored in the first storage unit so as to be correlated with the input user information, an image forming unit that forms an image corresponding to the image data acquired by the first acquiring unit, a counter unit that measures frequency in which image data corresponding to the user information stored in the first storage unit so as to be correlated with device information indicating an own device is acquired by another image forming device included in the plural image forming devices and stores the user information, the device information indicating the other image forming device, and the measured frequency in the second storage unit in a correlated manner, and a transmitting unit that transmits the user information and the device information stored in correlation with the frequency to the updating unit when the frequency stored in the second storage unit reaches a threshold value, and wherein the updating unit updates the device information so that the user information and the device information transmitted from the transmitting unit are stored in a correlated manner.

BRIEF DESCRIPTION OF THE DRAWINGS

Exemplary embodiments of the present invention will be described in detail based on the following figures, wherein:

FIG. 3 is a diagram showing an example of user information stored in the distribution server device;

FIG. 7 is a diagram showing an example of user information stored in the image forming device;

FIG. 15 is a diagram showing an example of user information after updating.

DETAILED DESCRIPTION

1. Configuration of Image Forming System

Figure 1:
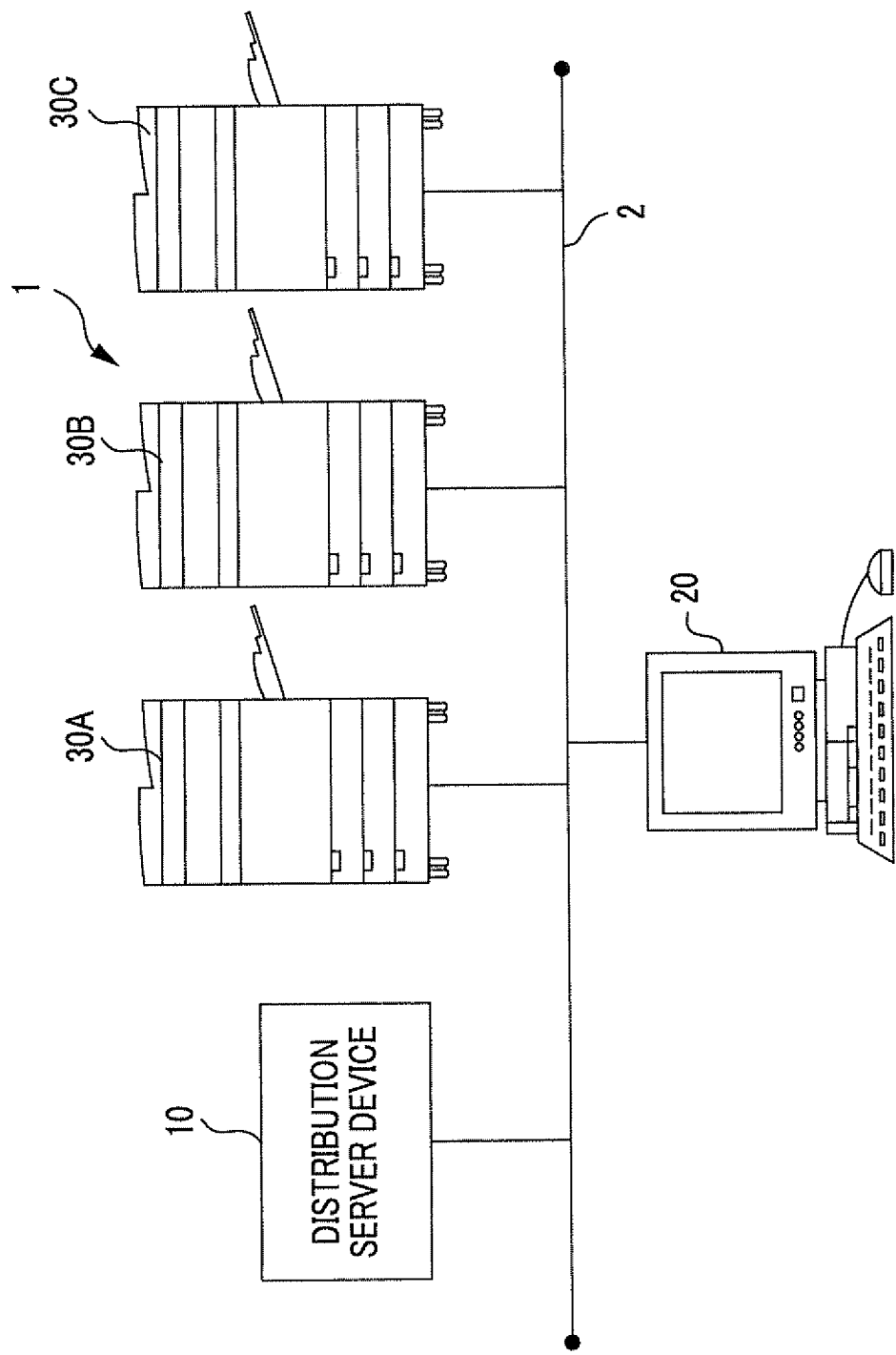
FIG. 1 is a schematic diagram showing the configuration of an image forming system.

FIG. 1 is a schematic diagram showing the configuration of an image forming system 1 according to an exemplary embodiment. The image forming system 1 includes a distribution server device 10, a client device 20, and image forming devices 30A, 30B, and 30C. The distribution server device 10, the client device 20, and the image forming devices 30A, 30B, and 30C are connected to each other via a communication line 2. The image forming system 1 has a structure such that image data may be stored in the image forming devices 30 to form an image corresponding to the image data using any of the image forming devices 30. In the following description, the image forming devices 30A, 30B, and 30C may sometimes be collectively referred to as "image forming devices 30" when they need not be distinguished from each other.

Figure 2:
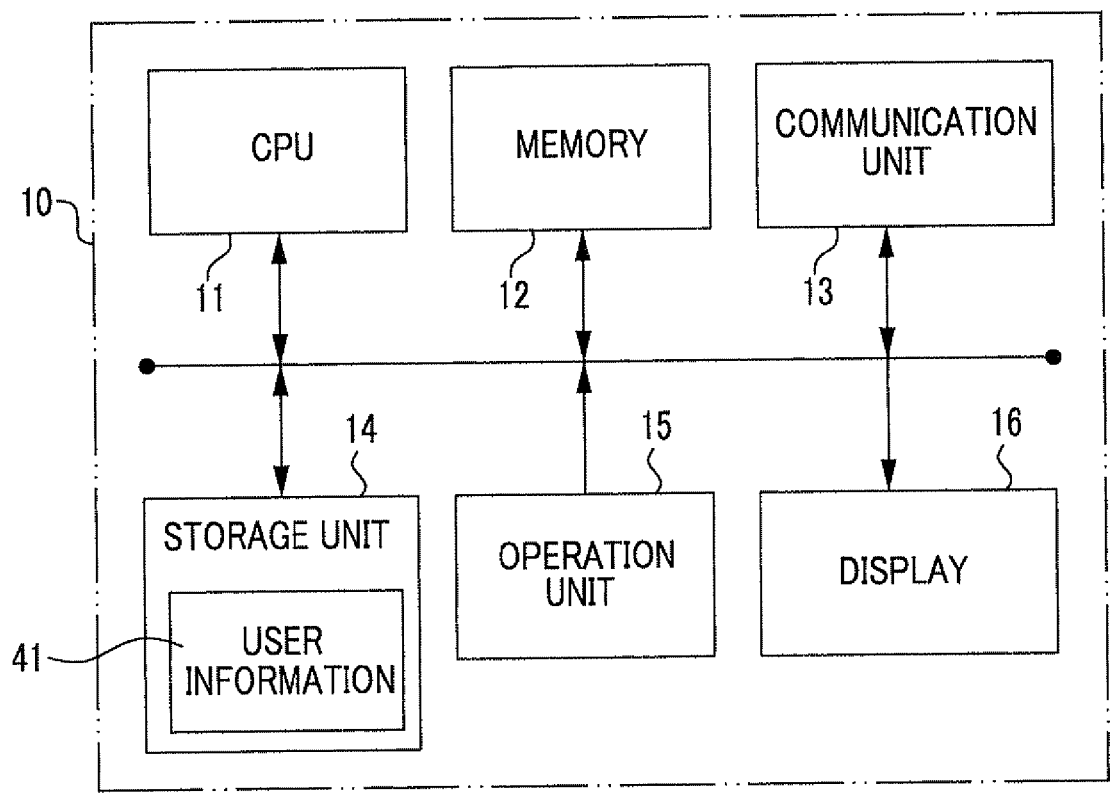
FIG. 2 is a diagram showing a hardware configuration of a distribution server device.

FIG. 2 is a diagram showing a hardware configuration of the distribution server device 10. The distribution server device 10 includes a central processing unit (CPU) 11, a memory 12, a communication unit 13, a storage unit 14, an operation unit 15, and a display 16. The CPU 11 controls each unit of the distribution server device 10 by executing a program stored in the memory 12. The communication unit 13 is a communication interface connected to the communication line 2. The distribution server device 10 communicates with the client device 20 or the image forming device 30 using the communication unit 13. The storage unit 14 is a storage device such as a hard disk. User information 41 is stored in the storage unit 14. The operation unit 15 includes a keyboard and a mouse, for example. The operation unit 15 is used for operating the distribution server device 10. The display 16 is a display device such as a liquid crystal display.

FIG. 3 is a diagram showing an example of the user information 41. In the user information 41, user ID is correlated with plural spooler information items. The user ID is information for identifying a user. The spooler information is information representing the image forming device 30 in which image data are stored. As the spooler information, an Internet protocol (IP) address or an identification number allocated to an image forming device, for example, are used. The spooler information items "spoolerA," "spoolerB," and "spoolerC" shown in FIG. 3 represent the image forming devices 30A, 30B, and 30C, respectively. Moreover, a priority order is allocated to the spooler information. The numbers "1," "2," and "3" shown in FIG. 3 represent the priority orders allocated to the spooler information items, respectively. In the following description, spooler information to which the priority order "1" is allocated is referred to as "primary spooler information," and spooler information to which the priority order "2" is allocated is referred to as "secondary spooler information."

When the user information 41 is created, two spooler information items randomly selected from "spoolerA," "spoolerB," and "spoolerC," for example, are allocated to each user ID. In this case, one priority order randomly selected from the priority orders "1" and "2" is also allocated to each spooler information. In the user information 41 shown in FIG. 3, primary spooler information "spoolerA" and secondary spooler information "spoolerC" are correlated with the user ID "user001." This means that image data corresponding to the user ID "user001" is stored in the image forming device 30A or the image forming device 30C. In this case, the image forming device 30A is used preferentially to the image forming device 30C.

Figure 4:
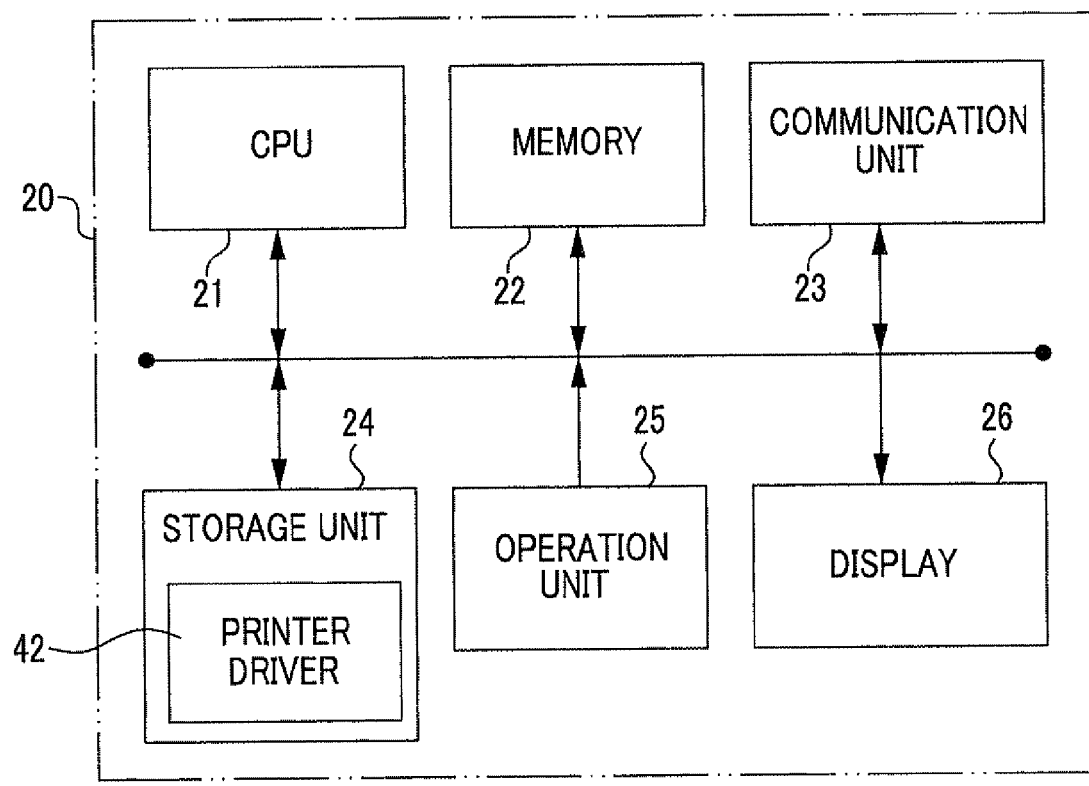
FIG. 4 is a diagram showing a hardware configuration of a client device.

FIG. 4 is a diagram showing a hardware configuration of the client device 20. The client device 20 includes a CPU 21, a memory 22, a communication unit 23, a storage unit 24, an operation unit 25, and a display 26. The CPU 21 controls each unit of the client device 20 by executing a program stored in the memory 22. The communication unit 23 is a communication interface connected to the communication line 2. The client device 20 communicates with the distribution server device 10 or the image forming device 30 using the communication unit 23. The storage unit 24 is a storage device such as a hard disk. A printer driver 42 is stored in the storage unit 24. The printer driver 42 is a program having a function of controlling the image forming device 30. The operation unit 25 includes a keyboard and a mouse, for example. The operation unit 25 is used for operating the client device 20. The display 26 is a display device such as a liquid crystal display.

Figure 5:
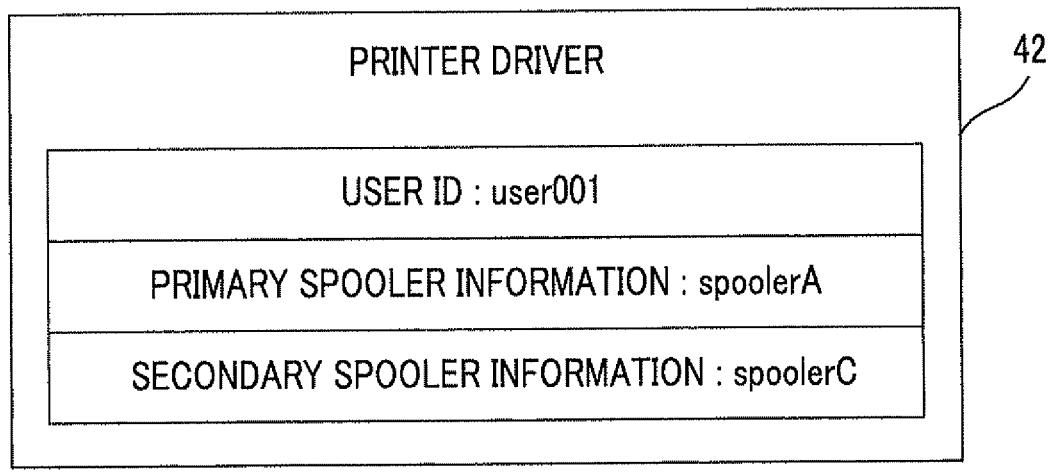
FIG. 5 is a diagram showing an example of information set to a printer driver.

Information necessary when transmitting image data to the image forming device 30 is set in the printer driver 42. FIG. 5 is a diagram showing an example of the information set in the printer driver 42. In the printer driver 42, the user ID "user001," the primary spooler information "spoolerA," and the secondary spooler information "spoolerC" included in the user information 41 shown in FIG. 3 are set. Only the primary spooler information and the secondary spooler information are set in the printer driver 42, and spooler information to which the priority order "3" is allocated is not set in the printer driver 42.

Figure 6:
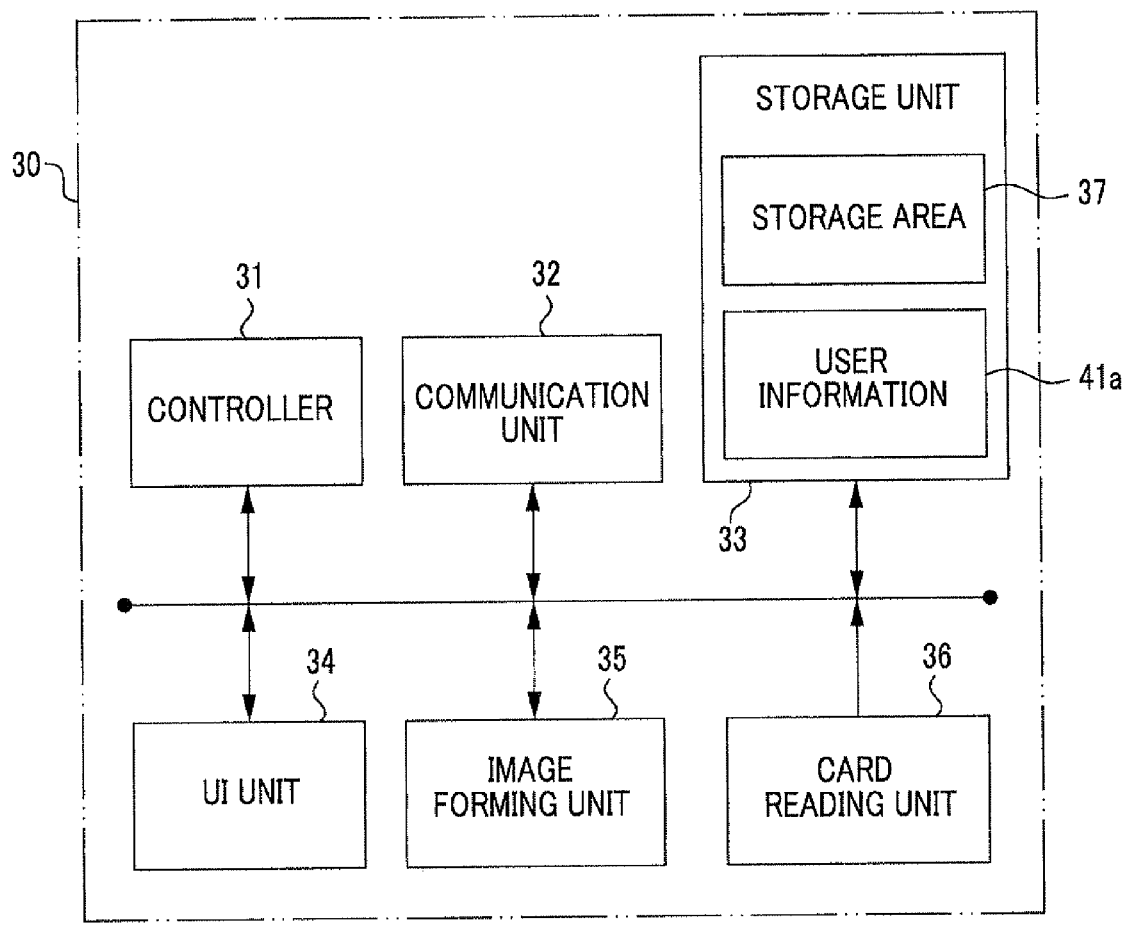
FIG. 6 is a diagram showing a hardware configuration of an image forming device.

FIG. 6 is a diagram showing a hardware configuration of the image forming device 30. The image forming device 30 includes a controller 31, a communication unit 32, a storage unit 33, a user interface (UI) unit 34, an image forming unit 35, and a card reading unit 36. The controller 31 controls each unit of the image forming device 30. The controller 31 includes a CPU and a memory, for example. The CPU implements the function of the controller 31 by executing a program stored in the memory. The communication unit 32 is a communication interface connected to the communication line 2. The image forming device 30 communicates with the distribution server device 10, the client device 20, or the image forming device 30 using the communication unit 32. The storage unit 33 is a storage device such as a hard disk or a flash memory. The storage unit 33 includes a storage area 37 in which the image data are stored. Moreover, user information 41a corresponding to the above-described user information 41 is stored in the storage unit 33.

The UI unit 34 includes a touch screen and an operation button, for example. The UI unit 34 is used for operating the image forming device 30. The image forming unit 35 is an electrophotographic printer, for example. The image forming unit 35 forms (prints) an image corresponding to the image data on a medium such as a paper. The card reading unit 36 reads information stored in an integrated circuit (IC) card in a non-contact manner. In order to perform authentication of a user, the IC card is provided to a user in advance. The user ID included in the above-described user information 41 is stored in the IC card. The image forming device 30 may include a configuration realizing the function of a scanner, a facsimile, and the like in addition to the above-described configuration. In the following description, when the configurations of the image forming devices 30A, 30B, and 30C need to be distinguished from each other, characters "A," "B," and "C" will be added to reference symbols of the configurations thereof.

FIG. 7 is a diagram showing an example of user information 41a. The user information 41a includes the same user ID and spooler information as the user information 41 shown in FIG. 3. Only the primary spooler information and the secondary spooler information are included in the user information 41a, and spooler information to which the priority order "3" is allocated is not included in the user information 41a.

Figure 8:
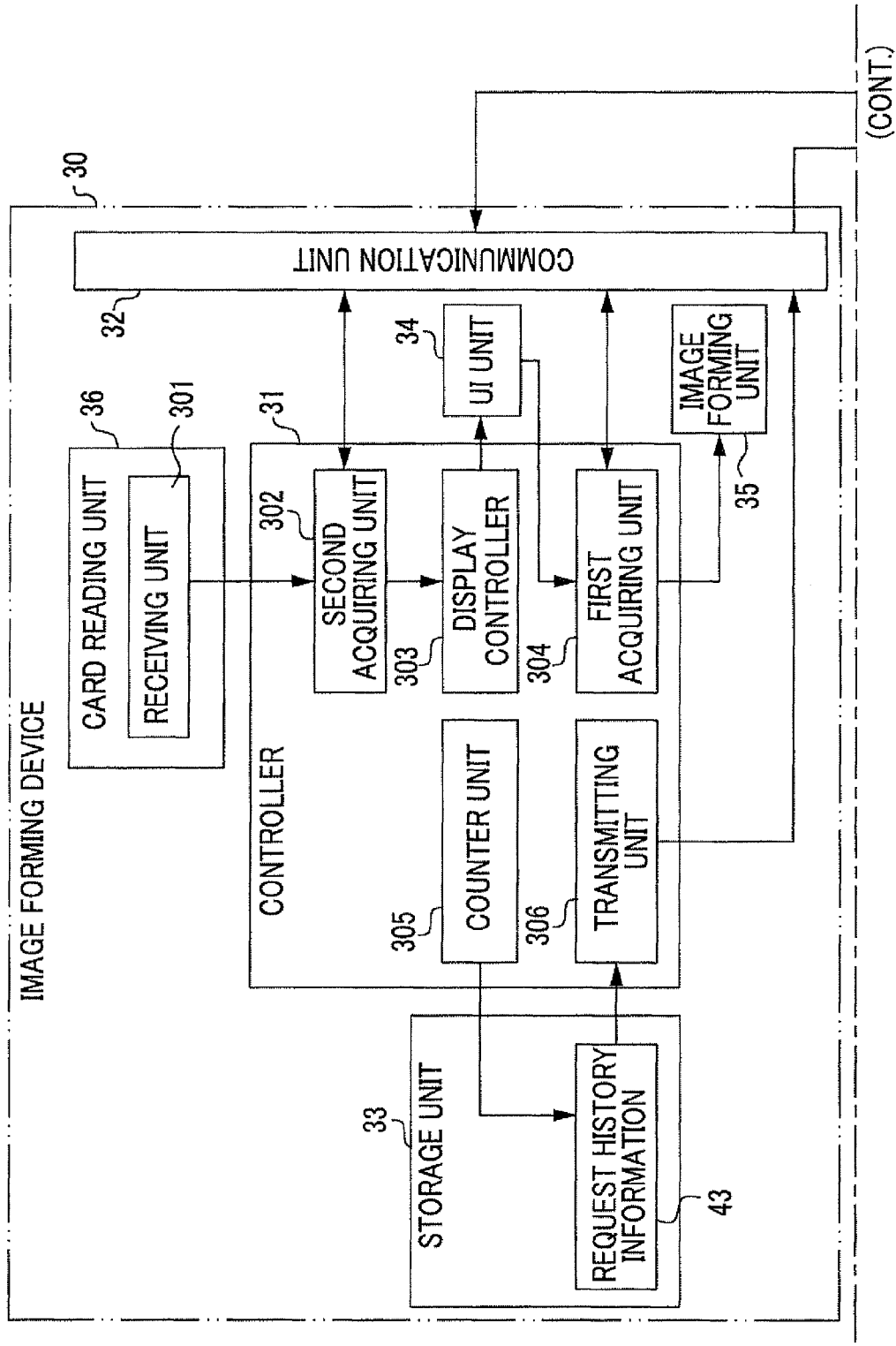
FIG. 8 is a diagram showing the functional configurations of the image forming device.
Figure 9:
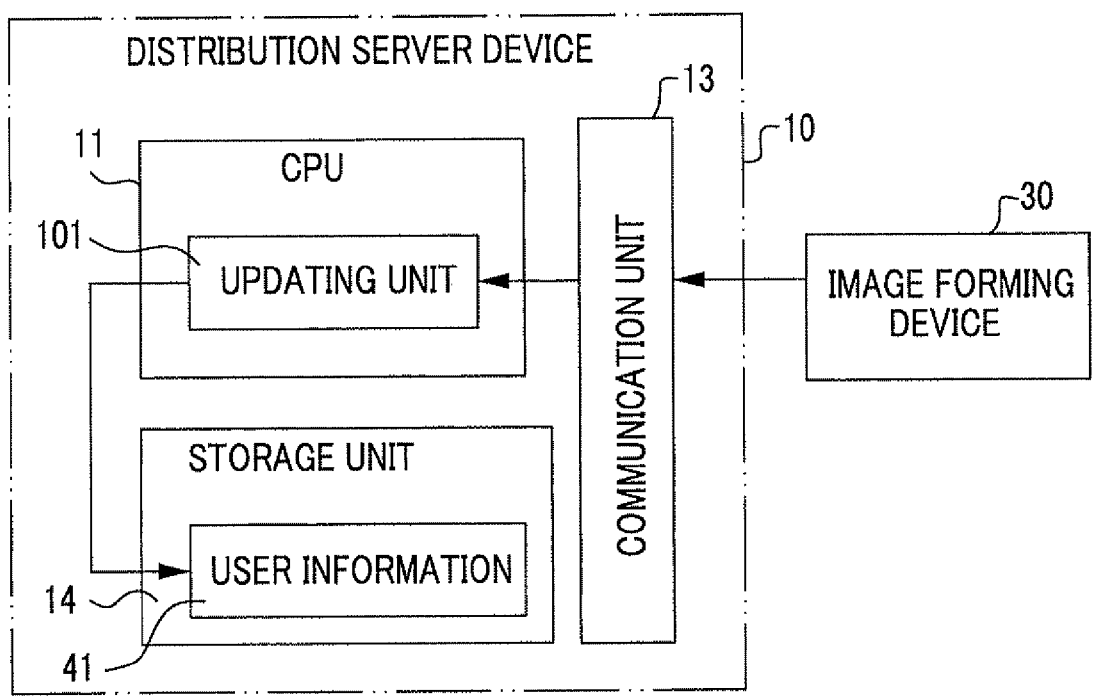
FIG. 9 is a diagram showing the functional configurations of the distribution server device.

FIG. 8 is a diagram showing the functional configurations of the image forming device 30. Respective image forming devices 30 have the same functional configuration. However, in FIG. 8, the functional configurations of one image forming device 30 are not illustrated for the other image forming device 30. A receiving unit 301 is realized by the card reading unit 36. A second acquiring unit 302, a display controller 303, a first acquiring unit 304, a counter unit 305, and a transmitting unit 306 are realized when the CPU in the controller 31, for example, executes a program. These functional configurations of the image forming device 30 may be realized by a single program and may be realized by plural programs. FIG. 9 is a diagram showing a functional configuration of the distribution server device 10. An updating unit 101 is realized when the CPU 11 executes a program.

The client device 20 (an example of a transmitting device) transmits image data corresponding to a user ID to the image forming device 30 indicated by the spooler information correlated with the user ID in the user information 41 stored in the storage unit 14 (an example of a first storage unit) of the distribution server device 10. Attribute information including information for identifying image data is appended to the image data. The spooler information is an example of device information representing the image forming device 30. Practically, the client device 20 transmits image data based on the information set in the printer driver 42. However, as described above, the user ID and the spooler information included in the user information 41 stored in the distribution server device 10 are set in the printer driver 42. Thus, it may be said that the client device 20 transmits image data based on the user information 41 stored in the distribution server device 10.

The receiving unit 301 receives the input of the user ID. The user ID is an example of identification information for identifying a user. The second acquiring unit 302 acquires attribute information appended to image data corresponding to a user ID that has been input from the image forming device 30 indicated by the spooler information correlated with the input user ID in the user information 41 stored in the distribution server device 10. The second acquiring unit 302 actually acquires the attribute information based on the user information 41*a* stored in the storage unit 33. However, as described above, the same user ID and the same spooler information as the user information 41 stored in the distribution server device 10 are included in the user information 41*a*. Thus, it may be said that the second acquiring unit 302 acquires the attribute information based on the user information 41 stored in the distribution server device 10.

The display controller 303 displays the attribute information acquired by the second acquiring unit 302 on the UI unit 34 (an example of a display). The first acquiring unit 304 acquires image data selected based on the attribute information displayed on the UI unit 34 from the image forming device 30 indicated by the spooler information correlated with the input user ID in the user information 41 stored in the distribution server device 10. Practically, the display controller 303 acquires the attribute information based on the user information 41*a* stored in the storage unit 33. However, for the same reason as that in the second acquiring unit 302 described above, it may be said that the display controller 303 acquires the image data based on the user information 41 stored in the distribution server device 10. The counter unit 305 measures the number of times when the image data corresponding to the user ID is acquired by the other image forming devices 30 with respect to the user ID stored in the storage unit 14 of the distribution server device 10 so as to be correlated with the spooler information representing the subject device. Then, the counter unit 305 stores the user ID, the spooler information representing the other image forming devices 30, and the measured number of times in the storage unit 33 (an example of a second storage unit) as request history information 43 in a correlated manner. The number of times measured by the counter unit 305 represents the frequency with which the image data is acquired by the other image forming devices 30 within a certain period. When the number of times stored in the storage unit 33 has reached a threshold value, the transmitting unit 306 transmits the user ID and the spooler information stored so as to be correlated with the number of times to the updating unit 101. The updating unit 101 shown in FIG. 9 updates the user information 41 stored in the storage unit 14 so that the user ID and the spooler information transmitted from the transmitting unit 306 are stored in a correlated manner.

2. Operation of Image Forming System (1) Print Operation

Figure 10:
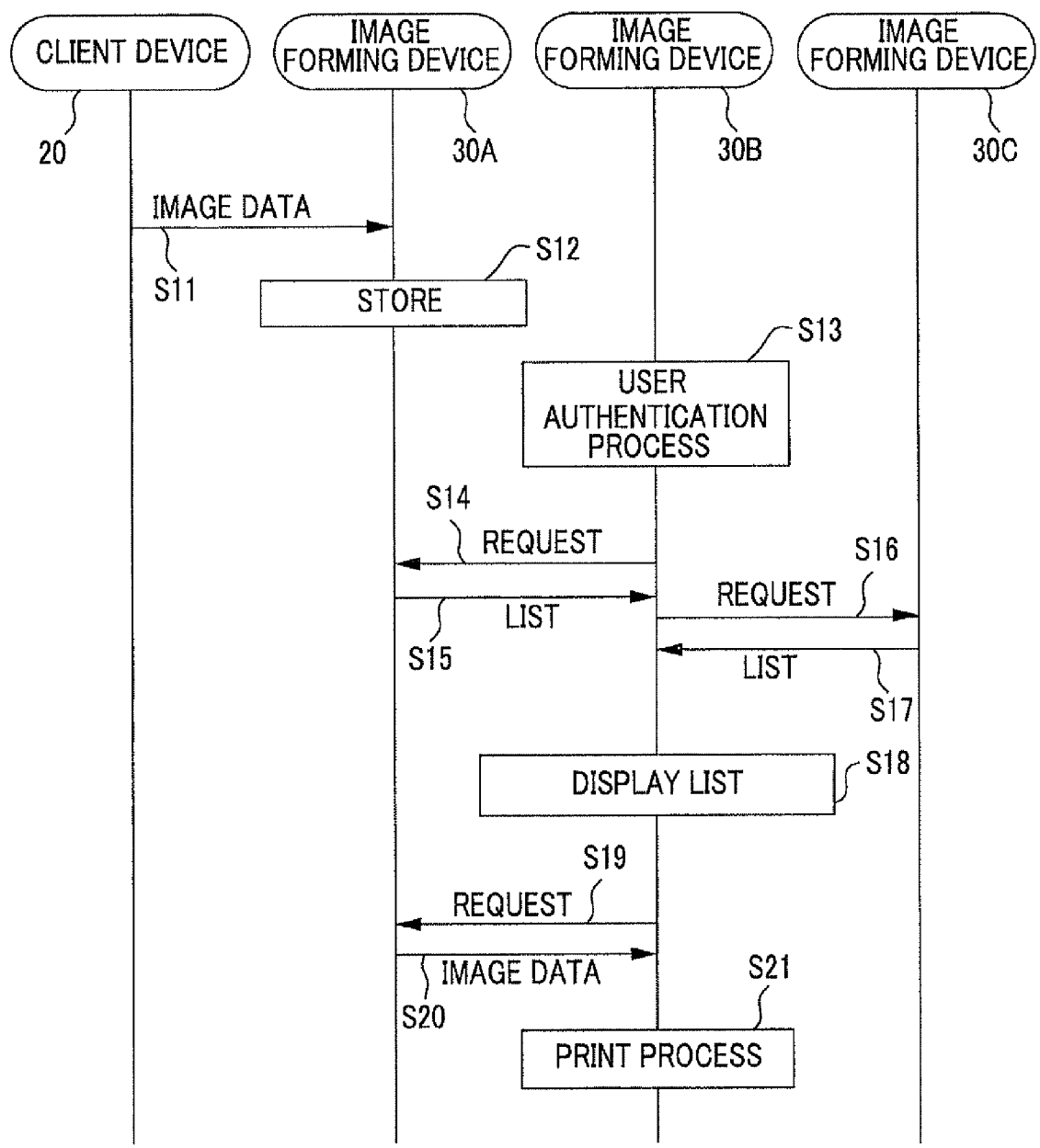
FIG. 10 is a sequence chart showing a print operation.

FIG. 10 is a sequence chart showing a print operation of the image forming system 1. The user operates the client device 20 to input a print instruction. Specifically, the user designates image data using the operation unit 25 and issues a print instruction. In this example, it is assumed that the user issues a print instruction by designating image data D1.

Upon receiving a print instruction, the client device 20 transmits image data D1 to the image forming device 30 based on the information set in the printer driver 42 (step S11). Specifically, the user ID "user001," the primary spooler information "spoolerA" and the secondary spooler information "spoolerC" are set in the printer driver 42 as shown in FIG. 5. In this case, the CPU 21 appends the attribute information including the user ID "user001" to the image data D1. In this way, the image data D1 is used as image data corresponding to the user ID "user001." Moreover, in addition to the user ID, information such as a file name for specifying the image data D1 is included in the attribute information.

After appending the attribute information, the CPU 21 controls the communication unit 23 to transmit the image data D1 to the image forming device 30A indicated by the primary spooler information "spoolerA." However, when a fault occurs in the image forming device 30A or a fault occurs in the communication line 2 between the client device 20 and the image forming device 30A, it is not possible to transmit the image data D1 to the image forming device 30A. As above, in a state where it is not possible to use the image forming device 30A, the CPU 21 controls the communication unit 23 to transmit the image data D1 to the image forming device 30C indicated by the secondary spooler information "spoolerC."

That is, the client device 20 transmits the image data corresponding to the user ID to the image forming device 30 which is available and indicated by spooler information having the highest priority order allocated thereto among the image forming devices 30 indicated by the spooler information set in the printer driver 42. Here, "available" means that image data may be stored in the image forming device 30. Whether the image forming device 30 is available or not is determined, for example, by transmitting an echo request to the image forming device 30 and determining whether an echo response is returned from the image forming device 30. When the image forming device 30 and the communication line 2 are operating properly, an echo response is returned from the image forming device 30. On the other hand, if a fault occurs in the image forming device 30 or a fault occurs in the communication line 2 between the client device 20 and the image forming device 30, an echo response is not returned from the image forming device 30. When no echo response is returned in a designated period, the client device 20 determines that the image forming device 30 is an unavailable state.

In this example, it is assumed that the image forming device 30A is available. In this case, the image data D1 is transmitted from the client device 20 to the image forming device 30A. Upon receiving the image data D1 from the client device 20, the image forming device 30A stores the image data D1 in a storage area 37A of the storage unit 33A. In this way, the image data D1 is stored in the image forming device 30A (step S12).

After issuing a print instruction, the user moves to a place where one of the image forming devices 30A, 30B, and 30C is located. For example, the user may move to a place where the image forming device 30 usually used by the user is located. When the image forming device 30 usually used by the user is being used by another user, the user may move to a place nearby where the image forming device 30 is located. Moreover, the user may move to a place where the image forming device 30 nearest to the present location of the user is located. That is, the user moves to the place of the image forming device 30 so that the user may use anyone of the image forming devices 30A, 30B, and 30C. In this example, it is assumed that the user moves to the place where the image forming device 30B is located.

An authentication screen is displayed on the UI unit 34 of the image forming device 30, and unless authentication is performed, the operation on the image forming device 30 is not received. The user performs authentication by passing an IC card over a card reading unit 36B in order to use the image forming device 30B. When the user ID is input via the card reading unit 36B, the image forming device 30B performs a user authentication process using the user ID (step S13).

Figure 11:
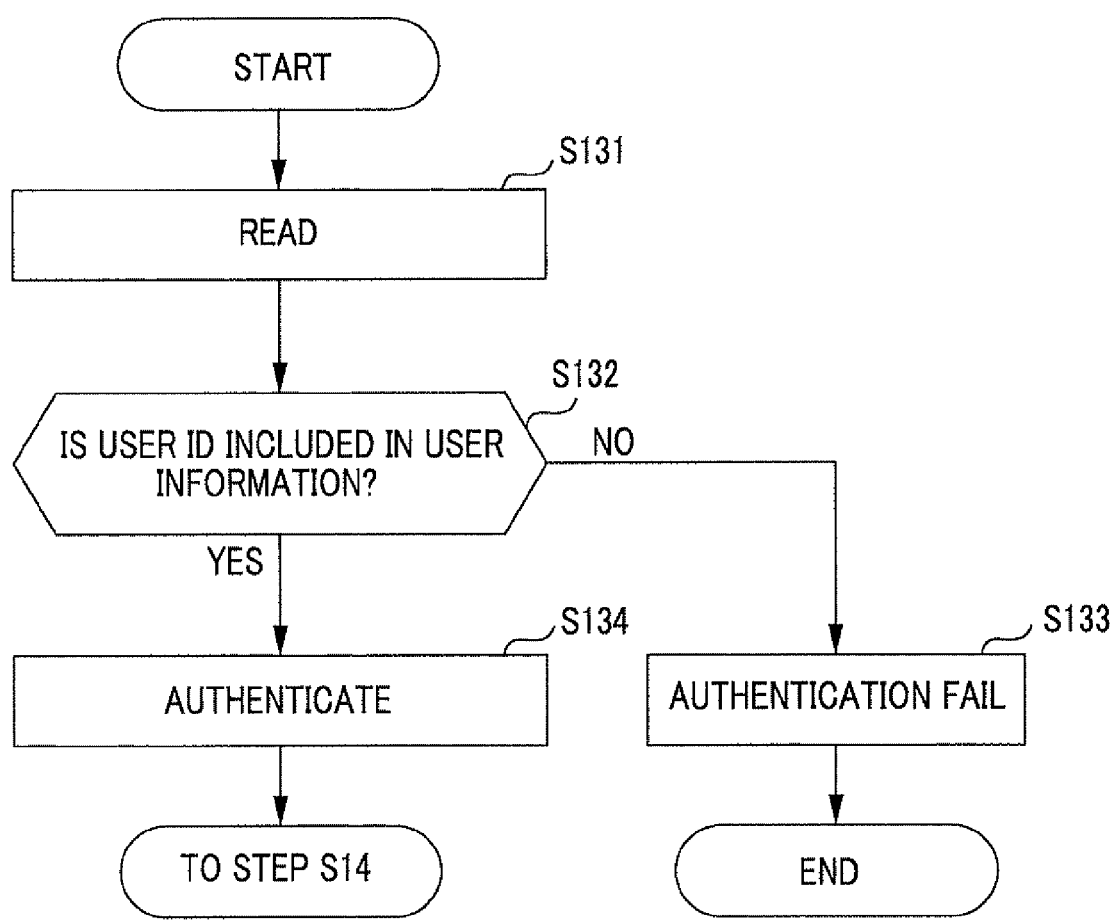
FIG. 11 is a flowchart showing a user authentication process.

FIG. 11 is a flowchart showing a user authentication process. In this example, it is assumed that a user ID "user001" is stored in the IC card. In this case, the card reading unit 36B reads the user ID "user001" from the IC card (step S131). A controller 31B determines whether or not the user ID "user001" is included in the user information 41a stored in the storage unit 33B (step S132). For example, when the user ID "user001" is not included in the user information 41a (step S132: NO), the controller 31B displays a message representing authentication failure on the UI unit 34B (step S133), and this process ends. In this case, it is not possible for the user to use the image forming device 30B. On the other hand, as shown in FIG. 7, when the user ID "user001" is included in the user information 41a (step S132: YES), the controller 31B authenticates the user as an authenticated user (step S134), and the flow proceeds to the next step S14.

The image forming device 30B acquires the list of image data corresponding to the user ID "user001" based on the user information 41a stored in the storage unit 33B. Specifically, as shown in FIG. 7, in the user information 41a, the primary spooler information "spoolerA" and the secondary spooler information "spoolerC" are correlated with the user ID "user001." In this case, the controller 31B controls the communication unit 32B to send a request for the list of image data corresponding to the user ID "user001" to the image forming device 30A indicated by the primary spooler information "spoolerA" (step S14 of FIG. 10).

The image forming device 30A creates a list in response to a request from the image forming device 30B and transmits the created list to the image forming device 30B (step S15). Specifically, the controller 31A determines whether image data to which the attribute information including the user ID "user001" is appended is stored in the storage unit 33A. As described above, the image data D1 to which the attribute information including the user ID "user001" is appended is stored in the storage unit 33A. In this case, the controller 31A reads the attribute information of the image data D1 from the storage unit 33A and arranges the read attribute information items in a line to thereby create a list. When the list is created, the controller 31A controls the communication unit 32A to transmit the created list to the image forming device 30B. The image forming device 30B receives the list from the image forming device 30A.

Subsequently, the controller 31B controls the communication unit 32B to send a request for the list of image data corresponding to the user ID "user001" to the image forming device 30C indicated by the secondary spooler information "spoolerC" (step S16). The image forming device 30C creates the list in response to the request from the image forming device 30B in the same manner as the image forming device 30A and transmits the created list to the image forming device 30B (step S17). In this example, it is assumed that the image data D2 corresponding to the user ID "user001" is stored in the storage unit 33C. The attribute information including the user ID "user001" is appended to the image data D2 similarly to the image data D1. In this case, the image forming device 30C arranges the attribute information items of the image data D2 in a line to create a list and transmits the created list to the image forming device 30B. The image forming device 30B receives the list from the image forming device 30C.

Figure 12:
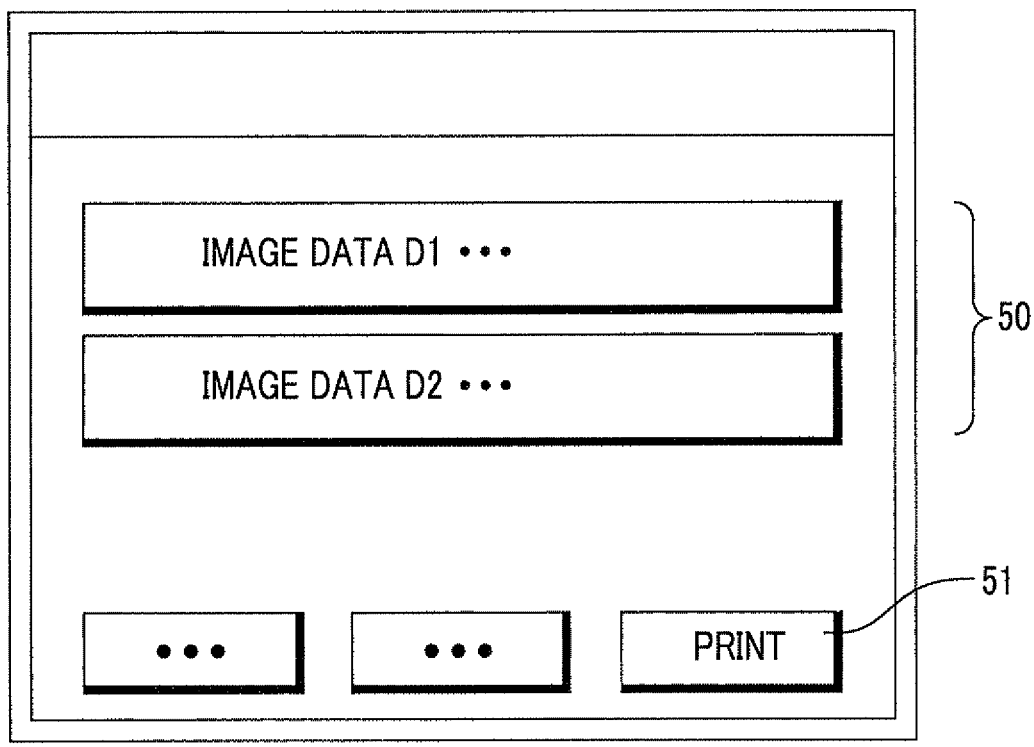
FIG. 12 is a diagram showing an example of an image data list.

Upon receiving the lists from the image forming devices 30A and 30C, the controller 31B aggregates the acquired lists and displays the aggregated list on the UI unit 34B (step S18). FIG. 12 is a diagram showing an example of an aggregated list 50. In the list 50, the attribute information of the image data D1 included in the list acquired from the image forming device 30A and the attribute information of the image data D2 included in the list acquired from the image forming device 30C are arranged in a line. Moreover, a "PRINT" button 51 for receiving a print instruction is displayed on the UI unit 34B together with the image data list 50. The user selects desired image data based on the image data list 50 displayed on the UI unit 34 and presses the "PRINT" button 51. In this example, it is assumed that the image data D1 is selected and the "PRINT" button 51 is pressed.

When the "PRINT" button 51 is pressed, the image forming device 30B acquires the image data D1 from the image forming device 30 in which the image data D1 is stored. Specifically, the controller 31B controls the communication unit 32B to send a request for the image data D1 to the image forming device 30A which transmitted the attribute information of the image data D1 (step S19). The image forming device 30A reads the image data D1 requested from the image forming device 30B from the storage unit 33A and transmits the image data D1 to the image forming device 30B (step S20). The image forming device 30B receives the image data D1 from the image forming device 30A.

Upon acquiring the image data D1, the image forming device 30B performs printing based on the image data D1 (step S21). Specifically, the controller 31B supplies the image data D1 to the image forming unit 35B and forms an image corresponding to the image data D1. The image forming unit 35B forms an image corresponding to the image data D1 on a medium under the control of the controller 31B.

(2) User Information Updating Operation

Figure 13:
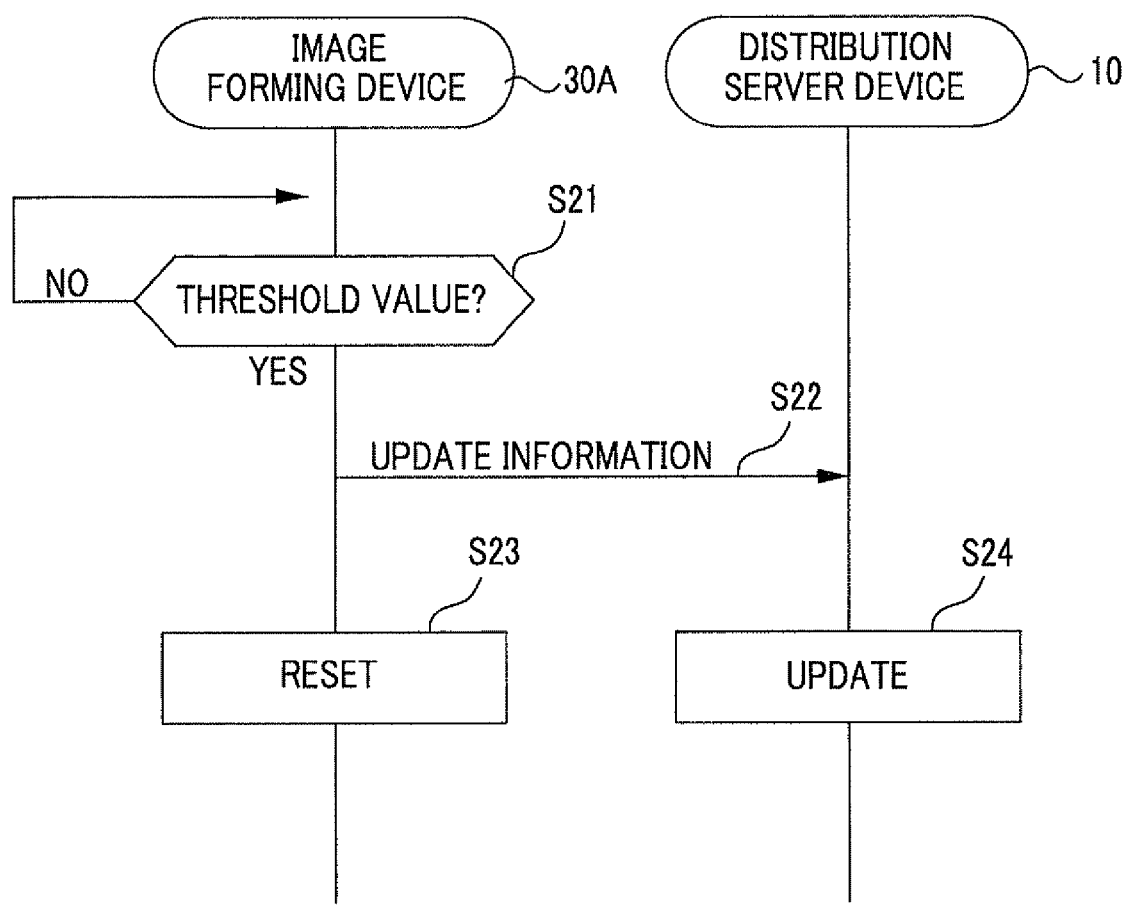
FIG. 13 is a sequence chart showing a user information updating operation.
Figure 14:
FIG. 14 is a diagram showing an example of request history information.

The user information 41 stored in the distribution server device 10 is updated depending on which image forming device 30 is frequently used by the user. FIG. 13 is a sequence chart showing an operation of updating the user information 41. The image forming device 30 counts (measures) the number of times when the image data list corresponding to the user ID is acquired by the other image forming devices 30 with respect to the user ID correlated with the spooler information representing the subject device in the user information 41a stored in the storage unit 33 and records the counted number of times in the request history information 43. The request history information 43 is stored in the storage unit 33. FIG. 14 is a diagram showing an example of the request history information 43. In the request history information 43, the user ID, the spooler information, and the request count are described in a correlated manner. The user ID is a user ID which is described in the user information 41a so as to be correlated with the spooler information representing the subject device. The spooler information is spooler information that represents the image forming device 30 other than the subject device. The request count is the number of times when the image data list is requested from the other image forming devices 30.

For example, in the user information 41a shown in FIG. 7, the user ID "user001" and the primary spooler information "spoolerA" are correlated with each other. In this case, the controller 31A counts the number of times when the image data list corresponding to the user ID "user001" is requested. As described above, when the image data list corresponding to the user ID "user001" is requested from the image forming device 30B, the controller 31A increases, by 1, a request count correlated with the spooler information "spoolerB" representing the image forming device 30B in the request history information 43 stored in the storage unit 33A.

When the request count of the request history information 43 stored in the storage unit 33 reaches a threshold value, the image forming device 30 transmits update information to the distribution server device 10. Specifically, the controller 31 determines whether the request count included in the request history information 43 has reached a threshold value (step S21 of FIG. 13). In this example, it is assumed that the threshold value is "5."

When all of the request counts included in the request history information 43 have not reached the threshold value (step S21: NO), the controller 31 returns to step S21. On the other hand, in the request history information 43 shown in FIG. 14, the request count correlated with the user ID "user001" and the spooler information "spoolerB" has reached the threshold value "5" (step S21: YES). In this case, the controller 31A extracts the user ID "user001" and the spooler information "spoolerB" correlated with the request count from the request history information 43 and creates update information including these information items. When the update information is created, the controller 31A controls the communication unit 32A to transmit the created update information to the distribution server device 10 (step S22). When the update information is transmitted, the controller 31A resets the request count correlated with the user ID "user001" in the request history information 43 (step S23) to 0.

Upon receiving the update information from the image forming device 30, the distribution server device 10 updates the user information 41 stored in the storage unit 14 at a predetermined time (for example, once every night at midnight) (step S24). FIG. 15 is a diagram showing an example of the user information 41 after update. Specifically, as described above, when the update information including the user ID "user001" and the spooler information "spoolerB" is received from the image forming device 30A, the CPU 11 lowers, by one step, the priority order of the primary spooler information "spoolerA" and the secondary spooler information "spoolerC" correlated with the user ID "user001" in the user information 41 shown in FIG. 3. In this way, as shown in FIG. 15, the priority order of the primary spooler information "spoolerA" is changed from "1" to "2" and the priority order of the secondary spooler information "spoolerC" is changed from "2" to "3." Moreover, the CPU 11 stores the spooler information "spoolerB" received from the image forming device 30A as the primary spooler information of the user ID "user001." In this way, as shown in FIG. 15, the user ID "user001" and the primary spooler information "spoolerB" are stored in a correlated manner. When receiving plural update information items including the same user ID from the image forming device 30, the distribution server device 10 performs the process of step S24 based on the update information received most recently.

(3) User Information Distributing Operation

The distribution server device 10 distributes the user information 41a corresponding to the latest user information 41 to the image forming device 30 in order to synchronize the user information 41 stored in the storage unit 14 with the user information 41a stored in the image forming device 30. Specifically, the CPU 11 reads the user information 41 from the storage unit 14 at a predetermined time (for example, once every night at midnight). The CPU 11 extracts the user ID, the primary spooler information, and the secondary spooler information from the user information 41 to create the user information 41a. The spooler information to which the priority order "3" is allocated is not included in the user information 41a. The CPU 11 controls the communication unit 13 to transmit the created user information 41a to the image forming devices 30A, 30B, and 30C. Upon receiving the user information 41a from the distribution server device 10, the image forming devices 30A, 30B, and 30C store the user information 41a in the storage units 33A, 33B, and 33C, respectively. In this way, the user information 41a stored in the image forming devices 30A, 30B, and 30C is updated.

(4) Printer Driver Updating Operation

The client device 20 updates the spooler information set in the printer driver 42 in order to synchronize the spooler information set in the printer driver 42 with the spooler information of the user information 41 stored in the distribution server device 10. Specifically, when a predetermined time comes, the CPU 21 controls the communication unit 23 to send a request for the spooler information corresponding to the user ID "user001" set in the printer driver 42 to the distribution server device 10. The predetermined time is when the first print instruction is received on each day, for example.

The distribution server device 10 extracts the spooler information requested from the client device 20 from the user information 41 stored in the storage unit 14 and transmits the spooler information to the client device 20. Specifically, the CPU 11 extracts the primary spooler information "spoolerB" and the secondary spooler information "spoolerA" correlated with the user ID "user001" requested to the client device 20 from the user information 41 shown in FIG. 15. The CPU 11 controls the communication unit 13 to transmit the extracted spooler information items to the client device 20. The spooler information "spoolerC" to which the priority order "3" is allocated is not transmitted to the client device 20. Upon receiving the spooler information from the distribution server device 10, the client device 20 sets the received spooler information in the printer driver 42. In this way, the spooler information set in the printer driver 42 is updated.

After the updating is performed, when the image data corresponding to the user ID "user001" is transmitted from the client device 20, the image data is transmitted to the image forming device 30B indicated by the primary spooler information "spoolerB" or the image forming device 30A indicated by the secondary spooler information "spoolerA." In this case, the image forming device 30B is used preferentially to the image forming device 30A.

In this exemplary embodiment, when the number of times that the image data list is requested from the other image forming devices 30 has reached a threshold value, the user information 41 stored in the distribution server device 10 is updated, and the spooler information representing the image forming device 30 is stored as the primary spooler information. In this way, the transmission destination of the image data of the client device 20 is changed to the other image forming device 30, and the image data transmitted from the client device 20 is stored in the image forming device 30. The fact that the number of times when the image data list is requested from the other image forming device 30 has reached the threshold value means that the frequency in which the user uses the image forming device 30 in displaying the image data list corresponding to the user ID thereof and forming an image is high. Thus, according to this exemplary embodiment, image data corresponding to the user is stored in the image forming device 30 corresponding to the frequency in which the user uses the image forming device in displaying the image data list and forming an image.

3. Modification Examples

The present invention is not limited to the above-described exemplary embodiment but may be modified in the following ways. Moreover, the following modification examples may be combined with each other.

(1) Modification Example 1

The method of counting the request count is not limited to the method described in the exemplary embodiment. For example, the image forming device 30 may count the number of times when the image data list 50 is continuously requested from the other image forming device 30.

(2) Modification Example 2

In the print operation described above, image data selected by the user is acquired after the image data list 50 is displayed. However, the list 50 may not necessarily be displayed. For example, after the user authentication process of step S13 shown in FIG. 10 is performed, the image data may be acquired without acquiring the list. In this case, the image forming device 30 sends a request for the image data corresponding to the input user ID to both image forming devices 30 indicated by the primary spooler information and secondary spooler information correlated with the input user ID in the user information 41a. In this case, the user does not need to select image data.

(3) Modification Example 3

When the subject device is used in displaying the image data list 50, the image forming device 30 may reset the request count of the request history information 43. Specifically, when displaying the list 50 described above, the controller 31 determines whether the user ID input by the user in the user authentication process is correlated with the spooler information representing the subject device in the user information 41a stored in the storage unit 33. When the input user ID is correlated with the spooler information representing the subject device, the controller 31 resets, to 0, the request count correlated with the user ID in the request history information 43 stored in the storage unit 33. In this way, when the subject device is used in displaying the image data list 50, it is unlikely that the user information 41 will be updated. Moreover, similar to Modification Example 2 described above, in a case where the list 50 is not displayed, the request count of the request history information 43 may be reset when the subject device is used in forming an image.

(4) Modification Example 4

The time when the process of step S24 is performed is not limited to the time described in the exemplary embodiment. For example, the distribution server device 10 may perform the process of step S24 whenever the update information is received from the image forming device 30.

(5) Modification Example 5

The function of the distribution server device 10 may be performed by any of the image forming devices 30 instead of the distribution server device 10. The image forming device 30 performs the function of the distribution server device 10 is determined in advance. In the following description, the image forming device 30 will be referred to as a "master device." In this case, the user information 41 is stored in the storage unit 33 of the master device in the same manner as the distribution server device 10. The master device performs the operation of updating and distributing the user information and updating the printer driver similarly to the distribution server device 10. For example, in the case of performing the user information updating operation, similarly to the distribution server device 10 described above, when the update information is transmitted from the other image forming device 30, the master device updates the user information 41 stored in the storage unit 33 so as to be correlated with the user ID and the spooler information included in the update information are stored in a correlated manner.

The master device may be provided in each sub-network. In this case, when distributing the user information 41a to the other image forming devices 30, the master device may distribute the user information 41a to only the other image forming devices 30 provided in the same sub-network. Moreover, the master device may be changed dynamically. For example, a priority order concerning the master device is set in each image forming device 30. In general, the image forming device 30 having the highest priority order becomes the master device. However, for example, in a state where it is not possible to use the image forming device 30 having the highest priority order such as when power is turned off, the image forming device 30 having the next highest priority order becomes the master device. The states of the image forming devices 30 are checked by periodically transmitting the echo request described above to each other, for example.

(6) Modification Example 6

The user authentication process described above is performed in the image forming device 30. However, the user authentication process may be performed on the distribution server device 10 side. In this case, the image forming device 30 sends a request for the user authentication process to the distribution server device 10. Specifically, the controller 31 controls the communication unit 32 to transmit the user ID input by the user to the distribution server device 10. In response to the request from the image forming device 30, the distribution server device 10 performs the same process as step S132 shown in FIG. 11 and responds to report whether or not authentication is successful. When there is a response from the distribution server device 10, representing that authentication has failed, the image forming device 30 proceeds to step S133 shown in FIG. 11. On the other hand, when there is a response from the distribution server device 10, representing that authentication is successful, the image forming device 30 proceeds to step S14 shown in FIG. 10.

Similarly to Modification Example 5 described above, when the master device performs the function of the distribution server device 10, the user authentication process may be performed on the master device side. In this case, an image forming device 30 other than the master device sends a request for the user authentication process to the master device. In response to the request, the master device performs the user authentication process and responds to report whether or not authentication is successful.

(7) Modification Example 7

When image data are transmitted from the client device 20, there may be a case where it is not possible to use the image forming device 30 indicated by the primary spooler information and the image forming device 30 indicated by the secondary spooler information. In this case, the client device 20 may acquire spooler information other than the primary spooler information and the secondary spooler information corresponding to the user ID set in the printer driver 42 from the distribution server device 10 and transmit image data to the image forming device 30 indicated by the spooler information.

(8) Modification Example 8

In the user information 41a stored in the image forming device 30, the primary spooler information and the secondary spooler information are included. However, the number of spooler information items included in the user information 41*a* is not limited to 2. For example, only one spooler information may be included, and three spooler information items or more may be included. The number of spooler information items included in the user information 41*a* is determined in advance. That is, a predetermined number of spooler information items selected based on the priority order are included in the user information 41*a*. Alternatively, all of the spooler information items in the user information 41 stored in the distribution server device 10 so as to be correlated with the user ID may be included in the user information 41*a*.

(9) Modification Example 9

In the user information distributing operation, only differences from the user information 41*a* distributed previously may be distributed. In this case, the image forming device 30 updates only the user information 41*a* corresponding to the difference received from the distribution server device 10.

(10) Modification Example 10

The user ID described above is an example of the user information for identifying the user. The user information is not limited to the user ID. For example, the user information may be a mail address allocated to the user. Moreover, as described above, since the IC card is provided to every user, the card ID allocated to the IC card may be used as the user information.

(11) Modification Example 11

The user authentication process may be performed without using the IC card. For example, the user may input the user ID thereof using the UI unit 34 of the image forming device 30. In this case, the UI unit 34 is used as the receiving unit that receives the user information input by the user. Moreover, biological information such as a fingerprint may be used instead of the user ID. In this case, a device for reading the biological information is provided in the image forming device 30. In this case, this device is used as the receiving unit that receives the user information input by the user.

(12) Modification Example 12

The user authentication process may be performed using a user ID and a password. In this case, the user ID and the password are stored in the user information items 41 and 41*a* in a correlated manner. When performing the user authentication process, the user input the password using the UI unit 34, for example.

(13) Modification Example 13

The configuration of the image forming system 1 is not limited to the configuration shown in FIG. 1. For example, the number of image forming devices 30 may be increased in accordance with the number of users. Moreover, a number of client devices 20 may be provided so as to correspond to the number of users.

(14) Modification Example 14

The image forming unit 35 may be a printer that forms an image by a method other than the electrophotographic method. Moreover, the image forming unit 35 may be one which forms a monochrome image and may be one which forms a color image. Although the UI unit 34 includes a touch panel used as a display, the UI unit 34 may include a display device such as a liquid crystal display instead of the touch panel.

(15) Modification Example 15

The program executed by the CPU 11, the CPU 21, or the CPU of the controller 31 may be provided in a state in which it is recorded in a recording medium such as a magnetic tape, a magnetic disk, a flexible disk, an optical disc, an magneto-optical disk, or a memory and may be installed in the distribution server device 10, the client device 20, or the image forming device 30. Moreover, the program may be downloaded to the distribution server device 10, the client device 20, or the image forming device 30 via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
 a plurality of image forming devices;
 a first storage unit that stores user information for identifying a user and device information indicating an image forming device included in the plurality of image forming devices in a correlated manner, the device information including a priority order of the plurality of image forming devices;
 an updating unit that updates the device information stored in the first storage unit; and
 a transmitting device that transmits image data to an image forming device correlated with the user information indicated by the device information stored in the first storage unit, responsive to the priority order of the plurality of image forming devices,
 wherein each image forming device included in the plurality of image forming devices includes
 a second storage unit that stores the image data transmitted from the transmitting device,
 a receiving unit that receives an input of the user information,
 a first acquiring unit that acquires image data from one of the plurality of image forming devices according to the priority order, the image data corresponding to the user information from an image forming device correlated with the input user information indicated by the device information stored in the first storage unit so as to be correlated with the input user information,
 an image forming unit that forms an image corresponding to the image data acquired by the first acquiring unit,
 a counter unit that measures frequency in which image data corresponding to the user information stored in the first storage unit so as to be correlated with device information indicating an own device is requested by other image forming devices included in the plurality of image forming devices and stores the user information, the device information indicating the other image forming devices, and the measured frequency in the second storage unit in a correlated manner, and a transmitting unit that transmits, responsive to the frequency stored in the second storage unit reaching a threshold value greater than one, the user information and the device information stored in correlation with the frequency to the updating unit of only an other image forming device having the frequency that has reached the threshold value, and wherein the updating unit updates the device information, including the priority order of the plurality of image forming devices, so that the user information and the device information transmitted from the transmitting unit are stored in a correlated manner.

2. The image forming system according to claim 1, wherein attribute information for identifying image data is appended to the image data, wherein each image forming device includes a second acquiring unit that acquires the attribute information appended to image data corresponding to the input user information from an image forming device indicated by device information stored in the first storage unit so as to be correlated with the input user information, and a display controller that controls to display the attribute information acquired by the second acquiring unit on a display, wherein the first acquiring unit acquires image data selected based on the attribute information displayed on the display, and wherein the counter unit measures frequency in which the attribute information appended to image data corresponding to the user information stored in the first storage unit so as to be correlated with the device information indicating the own device is acquired by the other image forming device instead of the acquired frequency.

3. An image forming device comprising:

a second storage unit that stores image data when the image data corresponding to user information stored in a first storage unit so as to be correlated with device information indicating an own device is transmitted from a transmitting device, the first storage unit storing user information for identifying a user and device information indicating an image forming device included in a plurality of image forming devices in a correlated manner, the device information stored in the first storage unit and the second storage unit including a priority order of the plurality of image forming devices;

an acquiring unit that acquires image data corresponding to input user information from an image forming device so as to be correlated with the input user information indicated by device information stored in the first storage unit when the input of the user information is received by a receiving unit, the device information indicating the priority order of the plurality of image forming devices;

an image forming controller that controls an image forming unit to form an image corresponding to the image data acquired by the acquiring unit;

a counter unit that measures frequency in which the image data corresponding to the user information stored in the first storage unit so as to be correlated with device information indicating an own device is requested by other image forming devices included in the plurality of image forming devices and stores the user information, the device information indicating the other image forming devices, and the measured frequency in the second storage unit in a correlated manner; and a transmitting unit that transmits, responsive to the frequency stored in the second storage unit reaching a threshold value greater than one, the user information and the device information stored so as to be correlated with the frequency to an updating unit of only an other image forming device having the frequency that has reached the threshold value, the updating unit updating the device information stored in the first storage unit.

4. The image forming device according to claim 3, further comprising:

the first storage unit; and the updating unit, wherein the updating unit updates the device information so that the user information and the device information transmitted from the transmitting unit or the other image forming device included in the plurality of image forming devices are stored in a correlated manner.

5. A non-transitory computer readable medium storing a program for causing a computer including a second storage unit that stores image data when the image data corresponding to user information stored in a first storage unit so as to be correlated with device information indicating a corresponding image forming device is transmitted from a transmitting device, the first storage unit storing user information for identifying a user and device information indicating an image forming device included in a plurality of image forming devices in a correlated manner to execute a process, the process comprising:

when a receiving unit receives the input of the user information, acquiring image data corresponding to the user information from the image forming device correlated with the input user information indicated by the device information stored in the first storage unit, the device information indicating a priority order of a plurality of image forming devices;

causing an image forming unit to form an image corresponding to the acquired image data;

measuring frequency in which the image data corresponding to the user information stored in the first storage unit so as to be correlated with device information indicating an own device is requested by other image forming devices included in the plurality of image forming devices and storing the user information, the device information indicating the other image forming devices, and the measured frequency in the second storage unit in a correlated manner; and transmitting, responsive to the frequency stored in the second storage unit reaching a threshold value greater than one, the user information and the device information stored so as to be correlated with the frequency to an updating unit of only an other image forming device having the frequency that has reached the threshold value, the updating unit updating the device information stored in the first storage unit, wherein the device information stored in the first storage unit and the second storage unit include the priority order of the plurality of image forming devices.

* * * * *